May 17, 1966        J. W. DRAKE        3,251,373
ALL-SPEED BALANCED GOVERNOR
Filed May 14, 1962        2 Sheets-Sheet 1
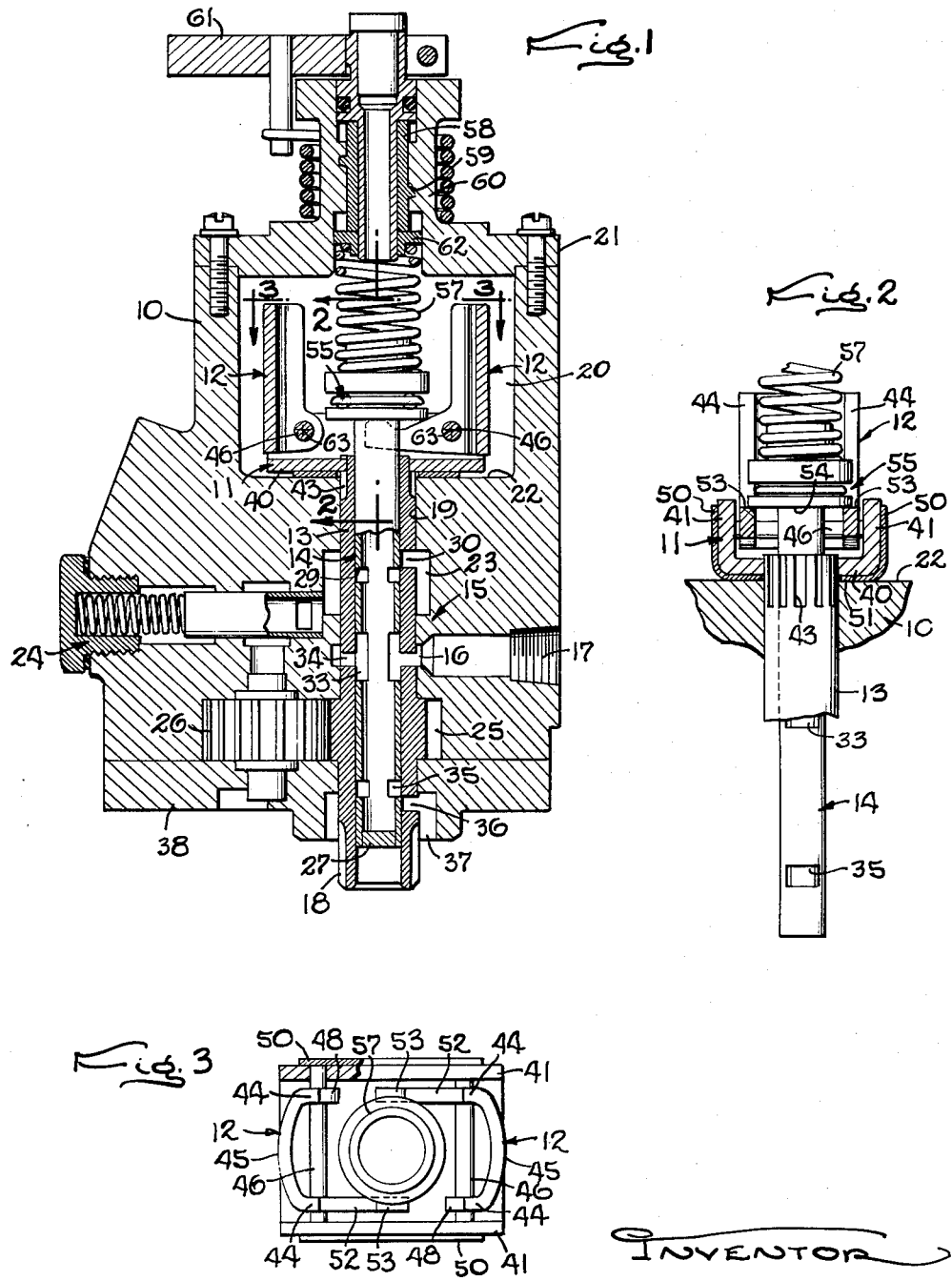
INVENTOR
James W. Drake
By [signature]
ATTORNEY May 17, 1966  J. W. DRAKE  3,251,373
ALL-SPEED BALANCED GOVERNOR
Filed May 14, 1962  2 Sheets-Sheet 2
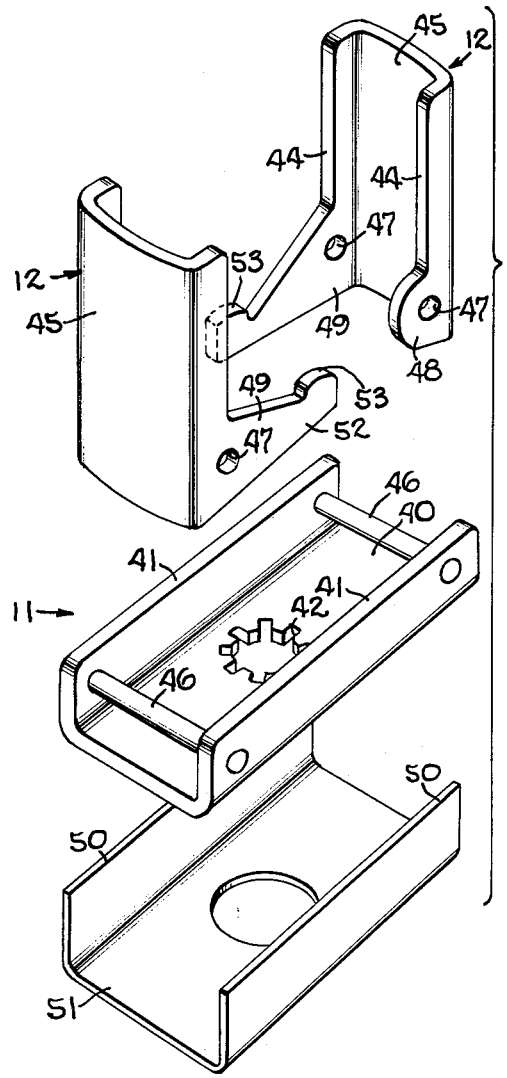
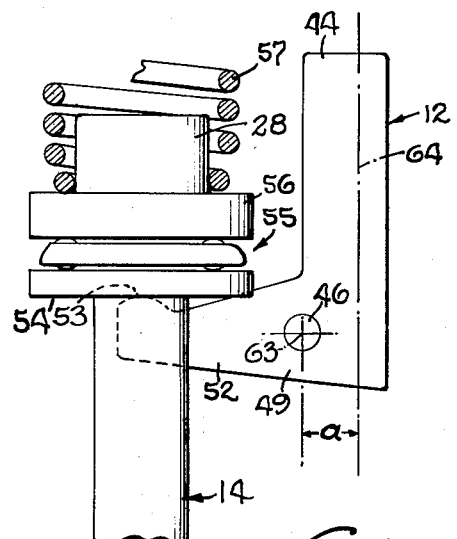
INVENTOR
James W. Drake
By Wolfe, Hubbard, Voit & Osann
ATTORNEY

United States Patent Office 3,251,373
Patented May 17, 1966

3,251,373
ALL-SPEED BALANCED GOVERNOR
James W. Drake, Rockford, Ill., assignor to Woodward Governor Company, Rockford, Ill., a corporation of Illinois
Filed May 14, 1962, Ser. No. 194,400
3 Claims. (Cl. 137—53)

This invention relates to a speed governor embodying flyweights fulcrumed on a rotary ball-head to swing about tangentially disposed pivots radially spaced outwardly from the ball-head axis and coupled to a control device such as a valve plunger disposed on and extending along such axis. When the mountings, that is the enclosing casing, of prior governors of the above character are subjected to bodily vibration or accelerations in an axial direction, the flyweights are rocked about their fulcrums without changes in the ball-head speed thus causing false speed corrections to be made.

The general object of the present invention is to eliminate such false action by substantially balancing the opposing forces exerted on the flyweights in response to axially directed accelerations of the governor mounting.

Another object is to utilize the mass of the flyweights which overhangs the pivotal axes thereof as a counterweight for balancing the masses of the connected moving parts disposed within such axes.

A more detailed object is to offset the pivotal axes of the flyweigghts inwardly from their conventional positions and correlate the amount of such offset with the weights and locations of the parts connected to the flyweights within such axes so that the opposing moments of inner and outer masses substantially balance each other.

A further object is to simplify the construction and reduce the cost of the flyweights and their mountings in a speed governor of the above character.

The invention also resides in the novel construction of the flyweights and their supporting ball-head which facilitates manufacture thereof as sheet metal stampings and facilitates attainment of the desired counterbalancing.

Other objects and advantages of the invention will become apparent from the following detailed description taken in connection with the accompanying drawings, in which FIGURE 1 is a longitudinal diametrical sectional view of a speed governor embodying the novel features of the present invention.

FIGS. 2 and 3 are cross-sections taken respectively along the lines 2—2 and 3—3 of FIG. 1.

FIG. 4 is an exploded perspective view of the parts of the ball-head.

FIG. 5 is an enlarged side elevational view of the flyweights and connected parts.

In the drawings, the invention in its different aspects is shown incorporated in a Woodward hydraulic governor of the type shown in Patent 2,204,640 for regulating the flow of pressure fluid to and from a hydraulic servo to maintain constant speed operation of a prime mover. Such governors comprise generally a hollow casing 10 housing a ball-head 11 carrying flyweights 12 and fixed to the upper end of a drive sleeve 13 which cooperates with a plunger 14 actuated by the flyweights to define a valve indicated generally at 15. The latter controls the flow of fluid such as oil into and out of a space 16 communicating through a passage 17 and piping (not shown) with the speed regulating servo.

The casing is usually mounted in the prime mover whose shaft is extended and coupled to the exposed lower end 18 of the sleeve 13. The latter projects through a bore 19 and into the ball-head cavity 20 which is closed by a cover 21, the wall of the bore defining a bearing for the sleeve which is supported as later described by the bottom surface 22 of the cavity. Intermediate the ends of the bore is an annular groove 23 to which oil under high pressure determined by a spring loaded regulating valve 24 is delivered from the outlet (not shown) of a pump comprising a gear 25 fast on the sleeve 13 and meshing with a gear 26.

In the present instance, the valve plunger 14 is a tube journaled within the sleeve and slidable axially thereof, the lower end of the tube being closed by a plug 27 while the upper end is closed at 28 and extends above the upper end of the sleeve and through the ball-head 11. Arcuate holes 29 in the tube, when in register with arcuate ports 30 in the sleeve admit pressure fluid from the groove 23 into the tube such fluid flowing out through axially elongated holes 33 in the tube which are in continuous registry with holes 34 in the sleeve 13 continuously communicating with the space 16 leading to the speed regulating servo. Holes 35 near the lower ends of the tube cooperate with ports 36 in the sleeve to close the tube or permit fluid to escape therefrom into a drain cavity 37 in the bottom plate 38 of the governor casing. In the centered or on-speed position of the valve tube, the ports 30 and 36 are both covered as shown in FIG. 1 thus preventing the flow of fluid to or from the servo whose position is thus maintained fixed.

In accordance with one aspect of the invention, the flyweights 12 and the parts of their supporting ball-head are of special channel construction so as to permit the same to be formed as simple sheet-metal stampings while facilitating the counterbalancing action described below. To this end, the ball-head comprises a straight channel having a flat bottom 40 and upstanding right angular and parallel flanges 41, the bottom being apertured at its center and formed with teeth 42 which telescope with teeth on the splined upper end 43 of the sleeve 13. The flyweights also comprise channel bars which are slightly narrower than the spacing of the ball-head flanges 41 and which comprise parallel flanges 44 and a connecting bottom or web 45 which is curved somewhat crosswise to provide a convex outer surface. The flyweight channels open toward each other and project upwardly along the sleeve axis and from opposite ends of the ball-head channel on which the lower ends of the flyweights are fulcrumed through the medium of pins 46 projecting through holes in the flanges 41 and holes 47 in enlargement or ears 48 and 49 at the ends of the flyweight flanges. The pins are held against endwise displacement in the ball-head by the upstanding flanges 50 on a channel shaped slip 51 in which the ball-head channel is seated. The clip is stamped from resilient sheet metal so as to provide a hardened and wear resistant bottom for the ball-head resting on the bottom 22 of the ball-head cavity.

The ears 49 on the flyweights are extended inwardly substantially perpendicular to the flyweights to form toes 52 which straddle the valve plunger 14 and are formed at their ends with rounded surfaces 53 which bear upwardly against a shoulder 54 on the plunger at opposite ends of a diameter of the shoulder. Herein, the shoulder comprises a washer loose on the plunger beneath an anti-friction bearing 55 whose balls also bear against a shoulder formed by a flange of a cup 56 pressed onto the upper end of the valve plunger 14. The cup telescopes with and provides an abutment for one end of a speeder spring 57 herein comprising a helical coil whose upper end telescopes with and abuts against a shouldered ring 62 slidable axially in the cover 21. The ring abuts against the lower end of a sleeve 58 threaded at 59 into a tubular extension 60 of the cover 21. By swinging a lever 61 back and forth, the stressing of the spring 57 may be adjusted to vary the speed setting of the governor for maintaining the desired prime mover speed.

It will be apparent that the force derived centrifugally from the flyweights during rotation of the ball-head and exerted on the valve plunger 14 through the toes 52 is balanced against the adjusted stress of the speeder spring 57. When the prime mover is running at and therefore is "on" the speed thus selected, the flyweights 12 will extend parallel to the governor axis and the valve plunger will be centered axially relative to the port in the sleeve. In this "on-speed" position shown in FIG. 1, the holes 29 in the plunger will be disposed below the ports 30 thus blocking the flow of high pressure fluid to the interior of the tubular plunger. At the same time, the holes 35 will be disposed above the drain ports 36 in the sleeve 13 thus blocking the escape of fluid from the plunger and therefore from the servo communicating with the space 16 in the governor casing and the holes 34 in the sleeve.

Now, if the speed of the prime mover increases, the flyweights will swing outwardly lifting the plunger from the on-speed position thus bringing the holes 29 into register with the ports 30 to admit high pressure fluid into the plunger and therefore to the servo. The flow continues until the off-speed condition has been corrected and the valve plunger returned to the centered position. Conversely, in response to under-speeding of the prime mover, the flyweights will swing inwardly thus allowing the speeder spring to lower the plunger holes 35 below the ports 36 and thereby allow fluid to escape from the plunger and therefore from the speed regulating servo. Lowering of the servo pressure and increasing of the prime mover speed continues until the valve plunger has again been centered by the flyweights.

In speed governors of the above character, it is customary to locate the fulcrum axes 63 of the flyweights 12 in planes including the longitudinal center lines and centers of gravity of the flyweights when the latter are in the on-speed positions or parallel to the governor axes. Such governors are subject to erratic and false corrective actions when, the mounting thereof, usually the controlled prime mover, is subjected to vibration or accelerations having a component in a direction longitudinally of the ball-head axis. I have discovered that such false action is attributable to the substantial unbalance of the respective masses of the flyweights and the connecting moving parts which are disposed inside and outside of the fulcrum axes and the wide difference in the moment arms at which these masses act in response to axially directed accelerations.

Based on this discovery, an important aspect of the present invention is to change the location of the flyweight axes 63 relative to their conventional positions so as to more nearly equalize the inner and outer masses and also adjust their effective movement arms so that the opposing moments of the two substantially counterbalance each other. This, I have found, may be achieved without interfering with the speed sensing function of the flyweights and simply by offsetting the pivot pins 46 proper distances $a$ inwardly from the centers 64 of gravity of the weights thus increasing the proportion of the flyweight masses overhanging these axes. This increase is accompanied by corresponding decreases in the lengths of the moment arms of the movable masses disposed inside of the axes, the masses being the flyweight toes 52, the valve plunger 14 and the parts thereon, and about half of the speeder spring 57. The desired location of the pivot pins may be ascertained by cut and try experimentation or it may be calculated from measurements of the weights of the different masses involved and location of their centers of gravity, all of such measurements being made with the flyweights in the on-speed position of the valve.

With the flyweights constructed as above described and the valve plunger of light weight tubular construction, the desired counter-balancing of the opposing moments is achieved by locating the axes substantially in the planes of the inner edges of the flyweight flanges 44. Thus, substantially the entire mass of the flyweight overhangs the pivot pins 46 and becomes effective in achieving the desired counterbalancing effect. Accordingly, these weights multiplied by the spacing of their centers of gravity outwardly from the pivot pins produce a resultant moment about the axes 63 which are balanced as accurately as practical against the sum of the moments about these same axes of the other moving masses disposed inside of the pivots. The balance of these opposing moments is not upset appreciably in service use of the governor in view of the relatively short range of swinging of the flyweights in making normal speed corrections through the medium of the valve.

It will be seen that the channel cross-section of the flyweights and the convex curvature of their outer faces facilitates the desired counterbalancing above described. That is to say, an optimum part of the weight is located outside of the pivots and the moment arms of such mass are of maximum length without requiring enlargement of the ball-head cavity to avoid interference with the flyweights or speeder spring during abnormal speed increases or decreases.

I claim as my invention:

1. In a hydraulic speed governor, the combination of, a rotatable tubular valve sleeve, a ball-head secured to one end of said sleeve and comprising a channel having an apertured bottom and upstanding parallel side flanges, a valve plunger slidable in said sleeve and having an annular shoulder spaced above and facing toward said channel bottom, a pair of flyweights each comprising an upright channel narrower than said base channel and each having inturned side flanges, parallel pins extending through aligned holes in the lower ends of said flyweight channels and the outer ends of said ball-head flanges, a U-shaped clip nested around the bottom of said ball-head channel and having upstanding flanges covering the ends of said pins, and parallel toes projecting inwardly from the lower ends of said flyweights and bearing upwardly at their free ends against said shoulder on diametrically opposite sides thereof, each of said toes constituting an integral extension of one of said flyweight flanges.

2. In a hydraulic speed governor, the combination of, a rotatable tubular valve sleeve, a ball-head secured to one end of said sleeve and comprising a channel having an apertured bottom and upstanding parallel side flanges, a valve plunger slidable in said sleeve and having an annular shoulder spaced above and facing toward said channel bottom, a pair of upright flyweights with their lower ends disposed within opposite ends of said base channel, parallel pins extending through alined holes in said lower ends and said ball-head channels, a U-shaped clip nested around the bottom of said ball-head channel and having upstanding flanges covering the ends of said pins, and parallel toes projecting inwardly from the lower ends of said flyweights and bearing upwardly at their free ends against said shoulder.

3. An all-speed governor which remains unresponsive at all speed settings to bodily accelerations along the governor axis having, in combination, a support, a rotary ball-head mounted thereon to turn about said axis and adapted to be driven by a prime mover to be maintained at different speeds determined by the governor speed setting, a plurality of flyweights angularly spaced around and fulcrumed at one end on said ball-head to swing about tangentially extending axes radially spaced outwardly from said governor axis, toes on said flyweights projecting inwardly from said flyweight axes and toward said governor axis, a device for use in regulating the speed of a prime mover mounted on said support for movement along said governor axis and coupled to the inner ends of said toes, means exerting a biasing force on said device in opposition to the centrifugal force developed by said flyweights and urging the device toward a centered on-speed position, speed setting means for adjusting said biasing force and the speed of said ball-head at which said flyweights are in said on-speed position, said flyweights, when in said on-speed position, extending parallel to said governor axis with the major weight of the flyweights being disposed outside of said flyweight axes, the mass of said flyweights which is disposed outwardly beyond said flyweight axes when the flyweights are in said on-speed position irrespective of the governor speed setting being sufficient to produce about such axes a force moment of a magnitude substantially equal to the force moment about such axes which is produced by the combined masses of said toes and other parts which are movable therewith and disposed inside of said axes whereby the positions of said flyweights correspond closely to the prevailing rotative speed of said ball-head during bodily accelerations of the governor along the governor axis.

References Cited by the Examiner

UNITED STATES PATENTS

| | | | |
|---|---|---|---|
| 993,982 | 5/1911 | Halliwell | 73—550 X |
| 1,405,178 | 1/1922 | Andrew | 73—550 X |
| 1,576,933 | 3/1926 | Romeyn | 73—551 X |
| 2,214,119 | 9/1940 | Brisbane | 137—58 X |
| 2,660,422 | 11/1953 | Parker | 73—522 |
| 2,762,384 | 9/1956 | Rosenberger | 137—56 X |

ISADOR WEIL, *Primary Examiner.*

CLARENCE GORDON, *Examiner.*